(12) United States Patent
Kuhl et al.

(10) Patent No.: US 11,753,536 B2
(45) Date of Patent: *Sep. 12, 2023

(54) OXYGEN-TIGHT PLASTIC, AND PACKAGING MATERIAL PRODUCED THEREFROM

(71) Applicants: Norbert Kuhl, Erlstätt (DE); Martin Wassmer, Caux (CH)

(72) Inventors: Norbert Kuhl, Erlstätt (DE); Martin Wassmer, Caux (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/073,425

(22) PCT Filed: Feb. 1, 2017

(86) PCT No.: PCT/EP2017/052137
§ 371 (c)(1),
(2) Date: Jul. 27, 2018

(87) PCT Pub. No.: WO2017/134096
PCT Pub. Date: Aug. 10, 2017

(65) Prior Publication Data
US 2019/0031873 A1   Jan. 31, 2019

(30) Foreign Application Priority Data
Feb. 1, 2016 (DE) .......................... 102016201498.6

(51) Int. Cl.
| | | |
|---|---|---|
| C08L 29/04 | (2006.01) |
| B32B 3/06 | (2006.01) |
| B32B 27/32 | (2006.01) |
| B32B 7/12 | (2006.01) |
| B32B 27/10 | (2006.01) |
| B32B 15/20 | (2006.01) |
| B32B 27/08 | (2006.01) |
| B65D 73/00 | (2006.01) |
| B32B 15/082 | (2006.01) |
| B32B 3/04 | (2006.01) |
| B32B 27/30 | (2006.01) |
| B32B 9/02 | (2006.01) |
| B32B 15/08 | (2006.01) |
| B65D 85/804 | (2006.01) |
| B65D 65/46 | (2006.01) |
| C08L 23/06 | (2006.01) |
| C08L 23/12 | (2006.01) |
| C08L 25/06 | (2006.01) |
| C08L 77/00 | (2006.01) |
| B29C 45/47 | (2006.01) |
| B29C 45/58 | (2006.01) |
| B29C 45/60 | (2006.01) |
| C08L 23/08 | (2006.01) |
| C08L 23/14 | (2006.01) |

(Continued)

(52) U.S. Cl.
CPC .............. *C08L 29/04* (2013.01); *B29C 45/47* (2013.01); *B29C 45/581* (2013.01); *B29C 45/60* (2013.01); *B32B 3/04* (2013.01); *B32B 3/06* (2013.01); *B32B 7/12* (2013.01); *B32B 9/02* (2013.01); *B32B 15/08* (2013.01); *B32B 15/082* (2013.01); *B32B 15/20* (2013.01); *B32B 27/08* (2013.01); *B32B 27/10* (2013.01); *B32B 27/306* (2013.01); *B32B 27/32* (2013.01); *B65D 65/466* (2013.01); *B65D 73/00* (2013.01); *B65D 85/8043* (2013.01); *C08L 23/06* (2013.01); *C08L 23/08* (2013.01); *C08L 23/12* (2013.01); *C08L 23/14* (2013.01); *C08L 25/06* (2013.01); *C08L 77/00* (2013.01); *B29L 2031/72* (2013.01); *B32B 2250/03* (2013.01); *B32B 2250/04* (2013.01); *B32B 2255/10* (2013.01); *B32B 2255/24* (2013.01); *B32B 2270/00* (2013.01); *B32B 2307/72* (2013.01); *B32B 2307/7242* (2013.01); *B32B 2307/7246* (2013.01); *B32B 2307/7248* (2013.01); *B32B 2307/7265* (2013.01); *B32B 2307/732* (2013.01); *B32B 2439/00* (2013.01); *B65D 65/40* (2013.01); *C08L 2201/06* (2013.01); *C08L 2201/14* (2013.01)

(58) Field of Classification Search
CPC .............................. C08L 29/04; C08L 101/16
See application file for complete search history.

(56) References Cited

U.S. PATENT DOCUMENTS

| | | | |
|---|---|---|---|
| 4,261,473 A | 4/1981 | Yamada et al. |
| 4,427,825 A | 1/1984 | Degrassi et al. |

(Continued)

FOREIGN PATENT DOCUMENTS

| | | | |
|---|---|---|---|
| CN | 1105333 A | 7/1995 |
| CN | 1430627 A | 7/2003 |

(Continued)

OTHER PUBLICATIONS

International Search Report for International Application No. PCT/EP2016/081458, dated Mar. 27, 2017.

(Continued)

*Primary Examiner* — Mark S Kaucher

(57) ABSTRACT

The invention relates to a polymer blend comprising 15 to 70 Wt. % of polyvinyl alcohol (PVOH) and/or of a PVOH copolymer as well as 30 to 85 Wt. % of a further polymer, to a method for preparing a polymer blend, to the use of a polymer blend for producing a packaging material and to a packaging material. The packaging material obtained from the polymer blend is characterized in particular by a low gas permeability and can be produced by means of cost-effective methods.

15 Claims, No Drawings

(51) Int. Cl.
 B65D 65/40 (2006.01)
 B29L 31/00 (2006.01)

(56) References Cited

U.S. PATENT DOCUMENTS

| | | | |
|---|---|---|---|
| 4,600,746 | A | 7/1986 | Schmukler et al. |
| 5,224,601 | A | 7/1993 | Gouge et al. |
| 5,322,866 | A | 6/1994 | Mayer et al. |
| 5,349,000 | A | 9/1994 | Robeson et al. |
| 5,362,778 | A * | 11/1994 | Famili .............. C08L 3/00 264/185 |
| 5,378,414 | A | 1/1995 | Derkach |
| 5,384,170 | A * | 1/1995 | Bastioli ............ A61F 13/15252 428/34.1 |
| 5,393,804 | A * | 2/1995 | George ................ C08L 3/02 524/53 |
| 6,369,215 | B1 * | 4/2002 | Peltonen .............. C08B 31/16 536/102 |
| 7,048,975 | B1 | 5/2006 | Tojo et al. |
| 8,410,200 | B2 | 4/2013 | Oakley et al. |
| 2002/0128384 | A1 | 9/2002 | Wang et al. |
| 2002/0187181 | A1* | 12/2002 | Godbey ................ A61Q 1/025 424/443 |
| 2006/0173104 | A1* | 8/2006 | Gatenholm .............. C08J 5/18 524/35 |
| 2006/0178343 | A1* | 8/2006 | Shimotoyodome .. A23K 20/163 514/60 |
| 2006/0251841 | A1 | 11/2006 | Yang et al. |
| 2010/0051861 | A1 | 3/2010 | Inubushi et al. |
| 2010/0081737 | A1 | 4/2010 | Bastioli et al. |
| 2011/0097528 | A1 | 4/2011 | Dippel et al. |
| 2011/0126497 | A1 | 6/2011 | Bauer et al. |
| 2011/0196071 | A1 | 8/2011 | Mentink et al. |
| 2012/0149844 | A1 | 6/2012 | Whitehouse |
| 2013/0131224 | A1 | 5/2013 | Bastioli et al. |
| 2014/0037916 | A1 | 2/2014 | Reilly et al. |
| 2015/0232263 | A1 | 8/2015 | Talon |
| 2015/0274413 | A1 | 10/2015 | Brandt Sanz et al. |
| 2015/0336736 | A1 | 11/2015 | Cabilli |
| 2017/0008694 | A1 | 1/2017 | Andreae et al. |
| 2017/0174417 | A1 | 6/2017 | Nordqvist et al. |
| 2018/0057844 | A1* | 3/2018 | Zhang ................ C12P 7/02 |
| 2018/0057884 | A1 | 3/2018 | Redei |
| 2018/0105658 | A1* | 4/2018 | Cho ................ G02F 1/133603 |

FOREIGN PATENT DOCUMENTS

| | | |
|---|---|---|
| CN | 102717969 A | 10/2012 |
| CN | 102977565 A | 3/2013 |
| CN | 102993654 A | 3/2013 |
| CN | 103044716 A | 4/2013 |
| CN | 104603027 A | 5/2015 |
| DE | 68907387 T2 | 10/1993 |
| DE | 691 18 000 T2 | 9/1996 |
| DE | 19802718 A1 | 7/1999 |
| DE | 102011052149 A1 | 1/2013 |
| DE | 102015115250 A1 | 3/2017 |
| EP | 0157612 A2 | 10/1985 |
| EP | 0441666 A2 | 8/1991 |
| EP | 0584590 A1 | 3/1994 |
| EP | 0603876 A1 | 6/1994 |
| EP | 1636305 B1 | 1/2009 |
| EP | 2 334 734 B1 | 9/2012 |
| EP | 2276789 B1 | 7/2014 |
| EP | 2937386 A1 | 10/2015 |
| EP | 2114218 B1 | 5/2016 |
| GB | 2189789 A | 11/1987 |
| JP | H0586250 A | 4/1993 |
| JP | H05125266 A | 5/1993 |
| JP | H06263954 A | 9/1994 |
| JP | 09296087 A * | 11/1997 |
| JP | 2001049100 A | 2/2001 |
| JP | 200172822 A | 3/2001 |
| JP | 2003-026887 A | 1/2003 |
| JP | 2005-015814 A | 1/2005 |
| JP | 6263954 B2 | 1/2018 |
| WO | WO 92/16583 * | 10/1992 |
| WO | WO-92/16583 A1 | 10/1992 |
| WO | WO-9216853 A1 * | 10/1992 ............ G01S 7/536 |
| WO | WO-93/20140 A1 | 10/1993 |
| WO | WO-2002078455 A1 | 10/2002 |
| WO | WO-2007/075782 A2 | 7/2007 |
| WO | WO-2007/118280 A1 | 10/2007 |
| WO | WO-2009153275 A1 | 12/2009 |
| WO | WO-2012124129 A1 | 9/2012 |
| WO | WO-2013120997 A1 | 8/2013 |
| WO | WO-2014067507 A2 | 5/2014 |
| WO | WO-2014202694 A1 | 12/2014 |
| WO | WO-2015/082982 A1 | 6/2015 |
| WO | WO-2015158838 A1 | 10/2015 |
| WO | WO-2015177591 A2 | 11/2015 |
| WO | WO-2016207849 A1 * | 12/2016 ............ C08L 29/04 |

OTHER PUBLICATIONS

Written Opinion of the International Searching Authority for International Application No. PCT/EP2016/081458, dated Mar. 27, 2017.

International Search Report for International Application No. PCT/EP2017/052137, dated Mar. 27, 2017.

Written Opinion for International Application No. PCT/EP/2017/052137, dated Mar. 27, 2017.

Polymer Blend definiton, Wikipedia, https://de.wikipedia.org/wiki/Polyblend.

Block copolymer definition, Chemgapedia, http://www.chemgapedia.de/vsengine/glossary/de/blockcopolymer.g . . . , Jun. 7, 2018.

Opposition against European Patent No. EP3359469, Patent Proprietors: Norbert Kuhl and Martin Wassmer, Opponent: Société des Produits Nestlé S.A., 68 pp., dated Jan. 9, 2020.

Bleisch, Günter, Horst-Christian Langowski, and Jens-Peter Majschak. *Lexikon Verpackungstechnik*. Hamburg: Behr. pp. 46-49,471, 472 (2014).

Gerhard Dietz and Roland Lippmann, *Wissensspeicher für Technologen: Verpackungstechnik*. Heidelberg: Hüthig. pp. 227, 236, 301 (1985).

Opposition against European Patent No. EP3411436, Patent Proprietors: Norbert Kuhl and Martin Wassmer, Opponent: Mitsubishi Chemical Corporation , 35 pp., dated Jun. 18, 2020.

International Standard ISO 15105-2 (2003).

* cited by examiner

OXYGEN-TIGHT PLASTIC, AND PACKAGING MATERIAL PRODUCED THEREFROM

CROSS-REFERENCE TO RELATED APPLICATION

The is the United States national phase of International Patent Application No. PCT/EP2017/052137, filed Feb. 1, 2017, which application claims priority to German Application No. 102016201498.6, filed Feb. 1, 2016, the entire contents of which are incorporated by reference.

FIELD OF THE DISCLOSURE

BACKGROUND

The invention relates to a polymer blend according to claim 1, a method for producing a polymer blend according to claim 7, the use of a polymer blend for producing a packaging material according to claim 11, and a packaging material according to claim 15.

However, the packaging material according to the invention can particularly not exclusively be suitable for packaging foods and be provided particularly as food container, for example, for receiving liquid, pasty, solid, powdery, particularly ground or pourable foods, for example, as part of a plastic coffee or tea capsule or also for receiving milk products or brew goods such as coffee, tea, instant beverages, or instant soups. However, the packaging material according to the invention can, among others, also be suitable for packaging pharmaceutical products, medical products, particularly sterile medical products, for which it can also be suitable for aseptic packaging, or it can be provided for other products, for which a low gas permeability of the packaging material is desired, such as the packaging of toners or ink cartridges for printers or copiers, or for air-sensitive electric or electronic devices and the like.

GENERAL DESCRIPTION

For the packaging of many products, it is necessary that the packaging material has a low gas permeability, particularly a low oxygen permeability. For example, this applies to the packaging of foods which, in the following, will be described in detail as an exemplary area of application, even if the packaging material according to the invention is not supposed to be limited to said area of application, but, as noted above, is also suitable for various other products, for which a low gas permeability of the packaging material is desired.

As a rule, plastic packaging is not impermeable or gas-tight, particularly not tight with regard to the inflow of oxygen which can interact with the packaged article. Therefore, the use of plastic packaging, particularly as food containers for oxygen-sensitive foods requires that they are provided with a gas-tight, waterproof, aroma-proof, and, if necessary, food-safe barrier layer if a loss of quality due to an exposure of the goods (foods) received by said packaging to oxygen is to be reduced to a minimum or even prevented. In addition, said barrier layer provides an aroma-proofing which ensures that the foods received by the plastic packaging do not lose their aroma even after longer periods of time. For example, but not exclusively, a water vapor barrier must additionally be provided, when the plastic packaging is used as a brew goods receiving unit in order to ensure that water-soluble substances of such a food container or its lid film or the barrier layer are not solvated or even dissolved during storage and/or a brewing process.

From WO 2014/067 507 A2, a capsule for receiving a brewing material, such as coffee, tea, or the like, is known. The capsule is formed from a plastic, particularly from PBT or a plastic from the PBT family. As gas barrier layer, WO 2014/067 507 A2 proposes a surface coating for achieving an oxygen-tightness and to furthermore apply the gas barrier layer by means of the plasma evaporation process with the use of silicon, among others. Such a plasma evaporation process uses silicon oxides which are evaporated in a (high) vacuum by means of an arc generated electrically by high voltage, wherein the silicon oxide vapor furthermore precipitates on the objects, the capsules, among others, located in the vacuum chamber. For this method for coating food packaging containers, DE 10 2011 052 149 A1 requires that silicon oxide $SiO_x$ is supposed to be used for that purpose, wherein x is supposed to be a number <2, preferably <0.9. As a further coating method for achieving an oxygen tightness, DE 10 2011 052 149 A1 proposes, among others, a plasma polymerization, for which preferably organosilanes are supposed to be used. All these methods are disadvantageous because they describe a technically elaborate method that is also very cost-intensive. In addition, the cost for achieving a suitable oxygen tightness, for example, for achieving a longer minimum storage life, is relatively high and therefore usually uneconomical, when compared to oxygen-tight packaging bags, in which the coffee capsules can be additionally packaged for achieving the required minimum shelf-life.

EP 0 603 876 A1 discloses a biodegradable packaging material comprising an oxygen-impermeable central layer of polyvinyl alcohol which is provided on both sides with a water vapor-impermeable layer of polyhydroxybutyrate, polyhydroxyvalerate or the copolymer thereof, wherein a layer of a cellulose derivative and/or of paper is arranged on each of these two water vapor-impermeable layers. This means that the oxygen-impermeable central layer of polyvinyl alcohol is provided on both sides with a water vapor-impermeable impermeable layer which, in turn, is covered with a layer of a cellulose derivative and/or of paper. It is thus a five-coat layer structure with an oxygen-impermeable central layer of polyvinyl alcohol in the middle.

WO 2015/177591 A2 discloses an aluminum capsule for preparing beverages, which can be filled particularly with ground coffee and has a housing body and a closing element. The closing element is a laminated film which has a multiplicity of layers, particularly an oxygen-impermeable barrier layer which can be made of PVOH and is arranged between a layer of PLA and a carrier layer of cellulose or PLA. In addition, an adhesive layer is provided between the oxygen-impermeable barrier layer and the layer.

DE 689 07 387 T2 improves the gas barrier property of polybutylene terephthalate (PBT) by adding an olefin-vinyl alcohol copolymer, particularly by adding EVOH, for producing a packaging material with improved gas impermeability. Both PBT and EVOH are not undisputed for the use as food packaging.

Therefore, there is a demand for materials for a packaging with low gas permeability, from which a food container (or at least a part of the food container) itself can be produced without having to apply a separate gas barrier layer or requiring any other elaborate production method. In particular, there is a demand for a plastic material, from which, for example, a (particularly single-layered) food container with low gas permeability can be produced essentially directly by means of a cost-efficient method, particularly primary shaping methods, such as injection molding, deep-drawing, or stretching.

Therefore, the problem addressed by the present invention is that of providing a plastic material, from which a packaging material or a packaging with low gas permeability can be produced in a simple and cost-efficient manner. In a further embodiment, the plastic, or the packaging produced therefrom, is furthermore supposed to be biodegradable, particularly compostable according to EN 13432 and/or EN 14995.

The problem is solved by a polymer blend according to claim 1 and a packaging material according to claim 15. Preferred embodiments of the polymer blend are disclosed in the dependent claims dependent on claim 1. Preferred embodiments of the packaging material are disclosed in the dependent claims dependent on claim 15. The problem according to the invention is further solved by a method for producing a polymer blend according to claim 7 and by the use of a polymer blend for producing a packaging material according to claim 11, wherein the dependent claims dependent on claim 7 and 11 disclose once again preferred embodiments.

The polymer blend according to the invention comprises 15 to 70% w/w polyvinyl alcohol (PVOH) and/or a PVOH copolymer and 30 to 85% w/w of a further polymer.

The method according to the invention for producing a polymer blend comprises the following steps: (a) Mixing polyvinyl alcohol (PVOH) and/or a PVOH copolymer and a further polymer, wherein the mass-related mixing ratio of the further polymer to PVOH and/or the PVOH copolymer lies in the range from 85:15 to 30:70; (b) fusing, mixing, and compacting of the mixture obtained in step (a) for achieving a homogenous mixture. In a further step (c), the homogenous mixture obtained in step (b) can be extruded, wherein the extrudate can be granulated in a further step (d). The homogenous mixture obtained with step (b) as well as the extrudate obtained in step (c) or the granulate material produced in step (d) can be subjected directly and immediately to a primary shaping process, for example, injection molding, deep-drawing, or stretching. The method according to the invention is particularly suitable for producing a polymer blend according to the invention.

The present invention further relates to the use of a polymer blend according to the invention for producing a packaging material with low gas permeability, particularly for producing a packaging material according to the invention.

The packaging material according to the invention is at least to some extent made from a polymer blend according to the invention. In the following, further details of the present invention and further embodiments thereof shall be described. However, the present invention is not limited to the following detailed description, it shall only serve as an illustration of the teaching according to the invention.

It must be noted that features described in connection with an exemplary embodiment or an exemplary object can be combined with every other exemplary embodiment or with every other exemplary object. In particular, features described in connection with an exemplary embodiment of the polymer blend according to the invention can be combined with every other exemplary embodiment of the polymer blend according to the invention and with every exemplary embodiment of the method according to the invention, the use according to the invention, or every exemplary embodiment of the packaging material according to the invention, and vice versa, unless expressly specified otherwise.

If a term is denoted with an indefinite or definite article, such as "a," "an" and "the" in the singular, it also includes the term in the plural, and vice versa, unless the context clearly specifies otherwise. The term "to comprise" as used herein not only includes the meaning of "to include" or "to contain" but can also mean "made of" and "essentially made of."

The polymer blend according to the invention comprises at least two components. One of the two components if a polyvinyl alcohol (PVOH), also called PVAL, and/or a PVOH copolymer. A PVOH copolymer is a polymer that consists of two or more different monomer units, wherein one of the monomer units is vinyl alcohol. During the further course of the description of the invention, the term polyvinyl alcohol shall also include PVOH copolymers, even if they are not explicitly mentioned. In the following, the term "plastic" shall also be used synonymously with the term "polymer."

Within the framework of the present invention, a polymer blend, frequently also known as polymer mixture, refers particularly to a mixture of at least two (different) polymers in their solid state, without a chemical reaction taking place or having taken place between the two polymers. In such a purely physical mixture, no chemical bonds are created between the macromolecules of the plastics used. An example for a polymer blend according to the invention is PE/PVOH or also PS/PVOH, wherein the slash between the two plastic names indicates that it is a polymer blend. However, in addition to the two aforementioned non-PVOH plastics polyethylene (PE) and polystyrene (PS), for example, polypropylene (PP) or polyamide (PA) and other thermoplastics can be used for the production of packaging materials from the polymer blend according to the invention, which can particularly be injection-molded.

If the weight portion of PVOH or the PVOH copolymer in the polymer blend is higher than 15%, a suitable increase of the oxygen tightness is detectable in a packaging material made therefrom, which increases with an increasing weight portion. With the increase of the oxygen-tightness, it is possible to achieve a longer minimum shelf life of the packaged product, for example, food, which goes hand in hand with maintaining the quality of the packaged food over a longer period of time. With the increase of the weight portion of PVOH, the oxygen tightness can be further increased, wherein, depending on the use of the non-PVOH components at a weight portion of approximately 70%, a certain saturation with regard to the increase of the oxygen-tightness is reached. The polymer blend can comprise particularly 20 to 65% w/w, particularly 25 to 60% w/w, particularly 25 to 50% w/w, particularly 30 to 50% w/w, for example, approximately 35 to 40% w/w, PVOH and/or PVOH copolymers.

Due to the use of a polymer blend, it is easier to influence or control the physical properties of the packaging material according to the invention than is the case with a singly-material thermoplastic as the base material for injection molding. The unblended use of PVOH as a further additional plastic layer would also result in an oxygen-tight food container, but such a PVOH layer would be water-soluble and would have to be protected by a water vapor barrier. When compared to the invention, this would result in enormous additional costs, which is precisely, what the invention attempts to prevent. In addition, the mechanical properties of such a PVOH layer, for example, its material hardness, are insufficient for many cases of application.

As already described above, the polymer blend contains at least one further polymer in addition to PVOH or a PVOH copolymer. The quantity share of the further polymer (in case of more than one polymer, the sum of the quantity shares of the further polymers) in the polymer blend is 30 to 85% w/w, particularly 35 to 80% w/w, particularly 40 to 75% w/w, particularly 50 to 75% w/w, particularly 50 to 70% w/w, for example, approximately 60 to 65% w/w.

For the further polymer, a non-PVOH or PVOH copolymer component, particularly a thermoplastic or injection-moldable plastic, can be used, such as polyethylene (PE), polystyrene (PS), polyamide (PA), polypropylene (PP), or also blends containing said polymers.

In a further preferred embodiment of the invention, the further polymer of the polymer blend according to the invention is a biodegradable polymer, particularly a plastic compostable according to EN 13432 and/or EN 14995. The further polymer can particularly be a biopolymer made of renewable raw materials. However, the biodegradable polymer does not necessarily have to be made from renewable raw materials but can, for example, also be a biodegradable crude oil-based polymer. The use of a biodegradable polymer as the further polymer of the polymer blend according to the invention is particularly preferred if the packaging material made of the polymer blend according to the invention is supposed to be compostable which, in turn, is particularly advantageous, when the packaged product, such as food, is supposed to be disposed of together with the packaging. For example, if the packaging material is used as a coffee or tea capsule, the used coffee or tea capsule can in such case be disposed of together with its content (brewed coffee powder or brewed tea) in the biowaste or the (industrial or household) compost or the like. As a result, it can be possible to weaken the ecology-based reservations of some consumers toward said products, such as coffee or tea capsules, or to increase the acceptance of such products, thus tapping into new markets for them.

The biodegradable polymer can be selected from the group consisting of aliphatic and aliphatic-aromatic polyesters, polyester amides, polylactic acids, polyhydroxy fatty acids, starch and derivatives, proteins, lignins, and cellulose derivatives. However, according to the invention, other native polymers, such as cellulose, or other plastics based on renewable raw materials can also be used as a component for the polymer blend according to the invention. According to the invention, bio-based polymers can also be used which, for example, are produced from organic compounds, such as starch, sucrose, or glucose. In addition, the bio-based polymers also include thermoplastics on lignin-basis or also epoxy acrylates on the basis of oils, for example, linseed or palm oil. These biopolymers are also included in the inventive concept. Biodegradable, crude oil-based polymers can also be used as the further polymer in the polymer blend according to the invention. Examples for biodegradable, crude oil-based polymers contain specific polyesters (particularly aliphatic and aliphatic-aromatic polyesters) but also polyvinyl alcohol and polybutylene adipate terephthalate (PBAT), polybutylene succinate (PBS), polycaprolactone (PCL), or polyglycolide (PGA). The plastics termed biodegradable polymers in the invention include, for example, thermoplastics made from polyhydroxyalkanoates, polyhydroxybutyrates, polycaprolactone, polyester, starch, Ingeo™, lignin, natural resins, natural waxes, natural oils, natural fatty acids, cellulose, proteins, or glucose. The above list of the biodegradable plastics usable according to the invention is not intended to be exhaustive. In addition, combinations of biodegradable polymers can also be used.

By means of a polymer blend according to the invention, which is made of biodegradable polymers and PVOH, it is possible to produce an oxygen-tight, biodegradable packaging material, contributing both to the extension of the minimum shelf-life and the reduction of trash mountains. The biodegradable polymers used in the polymer blend according to the invention are preferably biodegradable according to EN 13432 or EN 14995, i.e. their biodegradation can take place in industrial composting plants. This is advantageous because the degradation can take place under the conditions of an industrial composting plant, i.e. the degradation takes place within a few weeks at an increased temperature, increased humidity, and at a defined oxygen content.

In a further embodiment, the further polymer can be selected from the group consisting of polyethylene (PE), polypropylene (PP), polyamide (PA), and polystyrene (PS) as well as combinations thereof, or a different plastic common in the packaging industry. These materials for the further polymer are particularly suitable for areas of application, in which a biodegradation of the packaging material is not required or even unwanted. However, these polymers—depending on the further polymer used—can entail advantages with regard to processing, water vapor resistance, mechanical properties, costs, or the like. At the same time, an increased oxygen-tightness is achieved with the addition of polyvinyl alcohol (PVOH) and/or a PVOH copolymer according to the invention.

In one embodiment, the polymer blend according to the invention is available by mixing polyvinyl alcohol (PVOH) and/or a PVOH copolymer and a further polymer in a first step, wherein in a second step, which, at least to some extent, can also take place in a temporally parallel manner, a fusing and compacting under further mixing takes place, resulting in a homogenous mixture in the melt. The homogenous mixture, particularly as a melt, can be fed directly to a primary shaping process, for example, an injection-molding, deep-drawing, or stretching process. In particular, the polymer blend according to the invention can be obtained by the method according to the invention for producing a polymer blend, as shall be described in more detail below.

In one embodiment, the polymer blend according to the invention is present as a granulate material. This easy to manage form of the polymer blend facilitates the further processing of the polymer blend, for example, into a packaging material, for example, by means of injection molding, deep-drawing, stretching, and the like. This embodiment also facilitates the transport of the polymer blend from the place of manufacture to the place of its further processing and also facilitates the storage of the polymer blend.

The method according to the invention for producing a polymer blend comprises the following steps: (a) Mixing polyvinyl alcohol (PVOH) and/or a PVOH copolymer and a further polymer, wherein the mass-related mixing ratio of the further polymer to PVOH and/or the PVOH copolymer lies in the range from 85:15 to 30:70; (b) fusing, (further continuous) mixing, and compacting of the mixture obtained in step (a) for producing a homogenous mixture. In a further step, the homogenous mixture obtained in step (b) can be subjected to extrusion, wherein the extrudate obtained can be granulated in a further step (d). The method according to the invention is particularly suitable for producing a polymer blend according to the invention.

In one embodiment, the mixing according to step (a) and/or the fusing according to step (b) can, for example, be executed in a, possibly modified, injection molding machine screw or in a double screw extruder. As a result, a more intensive intermixing can be achieved while maintaining a particularly homogenous mixture of the polymer components which results in an evenly low gas permeability of the packaging material made from the polymer blend obtained as method product.

Without wanting to be tied to a theory, the inventors of the present invention assume that essentially no chemical compounds form between the polymers used during the production of the polymer blend; instead, the polymer chains of the two different polymers intertwine and bear against one another such that the resulting polymer blend has a low gas permeability, particularly an improved oxygen tightness.

In one embodiment of the method according to the invention, the mixing ratio of the further polymer to PVOH and/or the PVOH copolymer can lie particularly in the range from 80:20 to 35:65, particularly in the range from 75:25 to 40:60, particularly in the range from 75:25 to 50:50, 70:30 to 50:50, particularly in the range from 65:35 to 60:40.

The polymer blend according to the invention can be used particularly for producing a packaging material with low gas permeability, particularly for producing a packaging material according to the invention with low oxygen permeability. In particular, the polymer blend according to the invention can be used for producing a packaging material by means of injection molding, deep-drawing and/or stretching.

Within the framework of the invention, the term "low gas permeability" can particularly refer to a gas permeability, particularly an oxygen permeability, in the range from 0.1 to $1\times10^{-4}$ cm$^3$/cm$^2$/day/0.21 bar, measured according to ISO 15105-2. The measurement can be taken particularly at an atmospheric pressure of 1 bar, i.e. at a partial pressure of oxygen of approximately 0.21 bar and at a thickness of the sample, the gas permeability of which is measured, of 0.5 mm.

The polymer blend according to the invention can thus be used for producing a packaging material with a gas permeability in the range from 0.1 to $1\times10^{-4}$ day cm$^3$/cm$^2$/day/0.21 bar, particularly 0.15 to $0.9\times10^{-4}$ cm$^3$/cm$^2$/day/0.21 bar, particularly 0.2 to $0.8\times10^{-4}$ cm$^3$/cm$^2$/day/0.21 bar, measured according to ISO 15105-2.

In a further embodiment, the polymer blend according to the invention can be used for producing a biodegradable packaging material which is compostable according to EN 13432 and/or EN 14995. For that purpose, the polymer blend according to the invention, in addition to PVOH and/or a PVOH copolymer, contains as the further polymer a particularly biodegradable polymer, as, for example, is described in detail above.

The packaging material according to the invention is made at least partially from a polymer blend according to the invention. Particularly at least part of the packaging material according to the invention can be made from a polymer blend according to the invention, such as at least one container and/or one lid which can serve as packaging. However, it is also possible that, in addition to the polymer blend according to the invention, the packaging material according to the invention is also made from one or more further components. In a further embodiment, however, the packaging material is made exclusively from a polymer blend according to the invention.

The packaging material according to the invention can be produced from the polymer blend particularly by means of injection molding, deep-drawing and/or stretching. In one embodiment, the packaging material is designed as a container or a different three-dimensional molded body for receiving or packaging an article, wherein said molded body can be produced from the polymer blend according to the invention by means of injection molding and/or deep-drawing. In a further embodiment, the packaging material can have the shape of a film which can be suitable for wrapping, shrink-wrapping, or packaging of an article and which, for example, can be produced by means of stretching.

The packaging material according to the invention preferably has a low gas permeability. In particular, the packaging material according to the invention can have a gas permeability in the range from 0.1 to $1\times10^{-4}$ cm$^3$/m$^2$/day, particularly 0.15 to $0.9\times10^{-4}$ cm$^3$/m$^2$/day, particularly 0.2 to $0.8\times10^{-4}$ cm$^3$/m$^2$/day, measured according to ISO 15105-2.

In a further embodiment, the packaging material according to the invention can be biodegradable, particularly compostable according to EN 13432 and/or EN 14995. For that purpose, the packaging material according to the invention is produced preferably from a polymer blend according to the invention which, in addition to PVOH and/or a PVOH copolymer, contains as the further polymer a particularly biodegradable polymer, as, for example, is described in detail above.

The packaging material according to the invention can be, for example, a packaging material for food. In particular, it can be designed as a food container. However, as mentioned in the beginning, the packaging material according to the invention can also be a packaging material for other air-sensitive products, such as pharmaceutical products, medical products, particularly sterile medical products, for which it can also be suitable for aseptic packaging. However, the packaging material according to the invention can also be used for packaging air-sensitive toners or ink cartridges for printers or copiers, or for air-sensitive electric or electronic devices, and the like.

The present invention was described using specific embodiments and examples. However, the invention is not limited to said embodiments and examples, and different modifications thereof are possible without exceeding the scope of the present invention.

The invention claimed is:

1. A thermoplastic polymer blend for producing a packaging material that is compostable in accordance with EN 13432 and/or EN 14995, wherein the thermoplastic polymer blend consists essentially of two plastics, of which the first plastic is a thermoplastic polyvinyl alcohol (PVOH) and the second plastic is a biodegradable, thermoplastic bioplastic that is a compostable plastic in accordance with EN 13432 and/or EN 14995 selected from the group consisting of thermoplastic material produced from glucose, thermoplastic material produced from cellulose, and thermoplastic material produced from lignin, wherein the mass-related mixing ratio of the thermoplastics lies in the range from 15 to 70% w/w polyvinyl alcohol (PVOH) and 30 to 85% w/w of the second thermoplastic, and wherein a packaging material produced at least to some extent from the thermoplastic polymer blend has an oxygen permeability from 0.1 to $1\times10^{-4}$ cm$^3$/cm$^2$/day/0.21 bar, measured according to ISO 15105-2.

2. The thermoplastic polymer blend according to claim 1, obtainable by mixing, fusing, and compacting thermoplastic polyvinyl alcohol (PVOH) and the bioplastic, resulting in a homogenous mixture in the melt.

3. The thermoplastic polymer blend according to claim 2, wherein the homogenous mixture can be produced by means of an extruder or an injection molding machine screw.

4. The thermoplastic polymer blend according to claim 2, wherein the homogenous mixture can subsequently be subjected to granulation.

5. The thermoplastic polymer blend according to claim 1, wherein the thermoplastic polymer blend is in the form of a granulate material.

6. A method for producing a thermoplastic polymer blend according to claim 1, wherein the method comprises the following steps:
(a) mixing thermoplastic polyvinyl alcohol (PVOH) and the second plastic, wherein the mass-related mixing ratio of the second plastic to thermoplastic PVOH lies in the range from 85:15 to 30:70;
(b) fusing, mixing, and compacting of the mixture obtained in step (a) for achieving a homogenous mixture.

7. The method according to claim 6, further comprising:
(c) extruding the homogenous mixture obtained in step (b).

8. The method according to claim 7, further comprising:
(d) granulating the extrudate obtained in step (c).

9. The method according to claim 8, further comprising:
(e) primary shaping of the homogenous mixture, the extrudate, or the granulate material.

10. A packaging material that is produced at least to some extent from the thermoplastic polymer blend according to claim 1.

11. The packaging material according to claim 10, produced by means of primary shaping.

12. The packaging material according to claim 10, wherein the packaging material is a packaging material for food.

13. The thermoplastic polymer blend according to claim 1, wherein the second plastic is a food-safe, biodegradable, thermoplastic bioplastic.

14. The packaging material according to claim 10, wherein the packaging material is water-resistant.

15. The packaging material according to claim 10, wherein the packaging material is water-vapor-resistant.

* * * * *